(12) United States Patent
Che et al.

(10) Patent No.: US 10,229,588 B2
(45) Date of Patent: Mar. 12, 2019

(54) METHOD AND DEVICE FOR OBTAINING EVIDENCES FOR ILLEGAL PARKING OF A VEHICLE

(71) Applicant: Hangzhou Hikvision Digital Technology Co., Ltd., Zhejiang (CN)

(72) Inventors: Jun Che, Zhejiang (CN); Chao Wang, Zhejiang (CN); Weiwei Cai, Zhejiang (CN); Shiliang Pu, Zhejiang (CN)

(73) Assignee: Hangzhou Hikvision Digital Technology Co., Ltd. (CN)

( * ) Notice: Subject to any disclaimer, the term of this patent is extended or adjusted under 35 U.S.C. 154(b) by 60 days.

(21) Appl. No.: 15/516,795

(22) PCT Filed: Dec. 14, 2015

(86) PCT No.: PCT/CN2015/097268
§ 371 (c)(1),
(2) Date: Apr. 4, 2017

(87) PCT Pub. No.: WO2016/119532
PCT Pub. Date: Aug. 4, 2016

(65) Prior Publication Data
US 2018/0268687 A1  Sep. 20, 2018

(30) Foreign Application Priority Data
Jan. 26, 2015 (CN) .......................... 2015 1 0038589

(51) Int. Cl.
*G06K 9/00* (2006.01)
*H04N 7/18* (2006.01)
*G08G 1/017* (2006.01)

(52) U.S. Cl.
CPC ....... *G08G 1/0175* (2013.01); *G06K 9/00785* (2013.01); *G08G 1/017* (2013.01); *H04N 7/181* (2013.01)

(58) Field of Classification Search
CPC combination set(s) only.
See application file for complete search history.

(56) References Cited

U.S. PATENT DOCUMENTS

2013/0266190 A1* 10/2013 Wang .................. G06K 9/3258
382/105
2014/0036076 A1* 2/2014 Nerayoff ................ H04N 7/181
348/148

FOREIGN PATENT DOCUMENTS

CN   103903440   7/2014
CN   204117361   1/2015
KR   101069766   10/2011

OTHER PUBLICATIONS

Extended European Search Report; Application No. PCT/CN2015/097268; dated Apr. 24, 2018; 9 pages.

* cited by examiner

*Primary Examiner* — Thomas S McCormack
(74) *Attorney, Agent, or Firm* — Mark E. Bandy; Rankin Hill & Clark, LLP (57) ABSTRACT

The present application relates to the field of monitoring, and discloses a method and a device for obtaining evidences for illegal parking of a vehicle. In the method for obtaining evidences of the present application, a correspondence relationship between shooting positioning parameters of a first camera and a second camera is preset. The method for obtaining evidences comprises: taking a first photo of an illegally parked vehicle using the first camera and obtaining a current first shooting positioning parameter of the first camera; according to the correspondence relationship, calculating a second shooting positioning parameter of the second camera corresponding to the first shooting positioning parameter and controlling the second camera to take a second photo with the second shooting positioning parameter. Thereby the photos of the head and rear of the illegally parked vehicle are obtained simultaneously as the evidences for illegal parking for penalty.

17 Claims, 5 Drawing Sheets

METHOD AND DEVICE FOR OBTAINING EVIDENCES FOR ILLEGAL PARKING OF A VEHICLE

CROSS REFERENCES TO RELATED APPLICATIONS

This is a national stage application of International Application No. PCT/CN2015/097268 filed Dec. 14, 2015, which claims priority upon Chinese Patent Application No. 201510038589.9, filed with the State Intellectual Property Office of People's Republic of China on Jan. 26, 2015, and entitled "Method and device for obtaining evidences for illegal parking of a vehicle", which is hereby incorporated into the present application by reference in its entirety.

TECHNICAL FIELD

The present application relates to the field of monitoring, and particularly to the technology of obtaining evidences for illegal parking of a vehicle.

BACKGROUND

When peccancy processing is performed on an illegally parked vehicle, the existing industry standard "GA-T832 evidence image obtaining technical specification for behaviors violating the road transportation safety" 6.2.8 explicitly states that evidence images, which show that a motor vehicle is illegally parked, temporarily parked against rules, and that the driver is absent or the driver is on the spot but refuses to drive away immediately impeding other vehicles and pedestrians passing through, include information such as the marked line indicator clearly identifying "NO PARKING", cab features, panoramic features of the head and rear of a vehicle, a license plate number and the like. However, current techniques for obtaining evidences for illegal parking can only obtain information such as panoramic features of the head or rear of a target vehicle, a license plate number etc. Therefore, there are emergency needs for a monitoring technique of obtaining all of the required evidences for illegal parking simultaneously.

SUMMARY

The present application aims to provide a method and a device for obtaining evidences for illegal parking of a vehicle, which can obtain photos of head and rear of an illegally parked vehicle as illegal evidences for penalty.

In order to resolve the above technical problem, an implementation of the present application discloses a method for obtaining evidences for illegal parking of a vehicle, in which a correspondence relationship between shooting positioning parameters of a first camera and a second camera is preset, the method includes the following steps:

taking a first photo of an illegally parked vehicle using the first camera and obtaining a current first shooting positioning parameter of the first camera;

calculating a second shooting positioning parameter of the second camera corresponding to the first shooting positioning parameter according to the correspondence relationship and controlling the second camera to take a second photo with the second shooting positioning parameter, wherein the first photo is a photo of a vehicle head and the second photo is a photo of a vehicle rear, or the first photo is a photo of a vehicle rear and the second photo is a photo of a vehicle head;

determining whether the vehicle for which the first photo is taken and the vehicle for which the second photo is taken are the same one by an image analysis technique; and if the vehicle for which the first photo is taken and the vehicle for which the second photo is taken are the same one, storing the first photo and the second photo as evidences for illegal parking.

Implementations of the present application also disclose a device for obtaining evidences for illegal parking of a vehicle, including:

a setting unit is configured to preset a correspondence relationship between shooting positioning parameters of a first camera and a second camera;

an obtaining unit is configured to control the first camera to take a first photo of an illegally parked vehicle and obtain a current first shooting positioning parameter of the first camera;

a controller is configured to calculate a second shooting positioning parameter of the second camera corresponding to the first shooting positioning parameter according to the correspondence relationship and control the second camera to take a second photo with the second shooting positioning parameter, wherein the first photo is a photo of a vehicle head and the second photo is a photo of a vehicle rear, or the first photo is a photo of a vehicle rear and the second photo is a photo of a vehicle head;

a third determining unit is configured to determine whether the vehicle for which the first photo is taken and the vehicle for which the second photo is taken are the same one by an image analysis technique; and a storage is configured to store the first photo and the second photo as the evidences for illegal parking when determining result of the third determining unit is yes.

In order to achieve the above objects, embodiments of the present application also provide a storage medium, wherein the storage medium is configured to store an application for carrying out the method for obtaining evidences for illegal parking of a vehicle when executed.

In order to achieve the above objects, embodiments of the present application also provide an application program, wherein the application program is configured to carry out the method for obtaining evidences for illegal parking of a vehicle when executed.

In order to achieve the above objects, embodiments of the present application also provide an evidence obtaining system including a first camera and a second camera, wherein the first camera is configured to take a first photo of an illegally parked vehicle, the evidence obtaining system further includes:

a processor, a memory, communication interfaces and a bus, wherein the processor, the memory and the communication interfaces connect to and communicate with each other via the bus;

the memory is configured to store executable program codes;

the processor is configured to execute programs corresponding to the executable program codes by reading the executable program codes stored in the memory to perform:

obtaining a current first shooting positioning parameter of the first camera;

calculating a second shooting positioning parameter of the second camera corresponding to the first shooting positioning parameter according to the correspondence relationship and controlling the second camera to take a second photo with the second shooting positioning parameter, wherein the first photo is a photo of a vehicle head and the second photo is a photo of a vehicle rear, or the first photo is a photo of a vehicle rear and the second photo is a photo of a vehicle head;

determining whether the vehicle for which the first photo is taken and the vehicle for which the second photo is taken are the same one by an image analysis technique; and if the vehicle for which the first photo is taken and the vehicle for which the second photo is taken are the same one, storing the first photo and the second photo as evidences for illegal parking.

The main difference and effects of implementations of the present application over the prior art are:

By pre-establishing the correspondence relationship between the shooting positioning parameters of two cameras, it is possible to control one of the cameras to adjust the shooting direction in case that the other camera finds an illegally parked vehicle, so as to shoot the illegally parked vehicle simultaneously or within a predetermined time period, to thereby obtain photos of the head and rear of the illegally parked vehicle, wherein the photos obtained as evidences can satisfy the standards for penalizing illegal parking in the industry standards.

Further, the first camera takes a first photo of an illegally parked vehicle after detecting this vehicle, and transmits shooting positioning parameters to the second camera for taking the second photo. Since the first photo may not be a clear photo of the head or rear of the illegally parked vehicle, it is required to adjust other shooting parameters again such as the amplification ratio, exposure rate and the like, so as to take a clear photo that can be used as the illegal parking evidence.

Further, by verifying if the vehicles taken by the two cameras are the same one, it is possible to effectively avoid increasing manual verification costs due to incorrect snap-shotting.

DETAILED DESCRIPTION

In the following description, a number of technical details are proposed for readers to better understand the present application. However, a person skilled in the art can understand that the technical solutions claimed in the claims of the present application can be achieved even without these technical details and various variations and modifications based on the following various embodiments.

Hereinafter, implementations of the present application will be further described in detail in combination of the accompanying figures to make the objects, technical solutions and advantages of the present application more clear.

Figure 1:
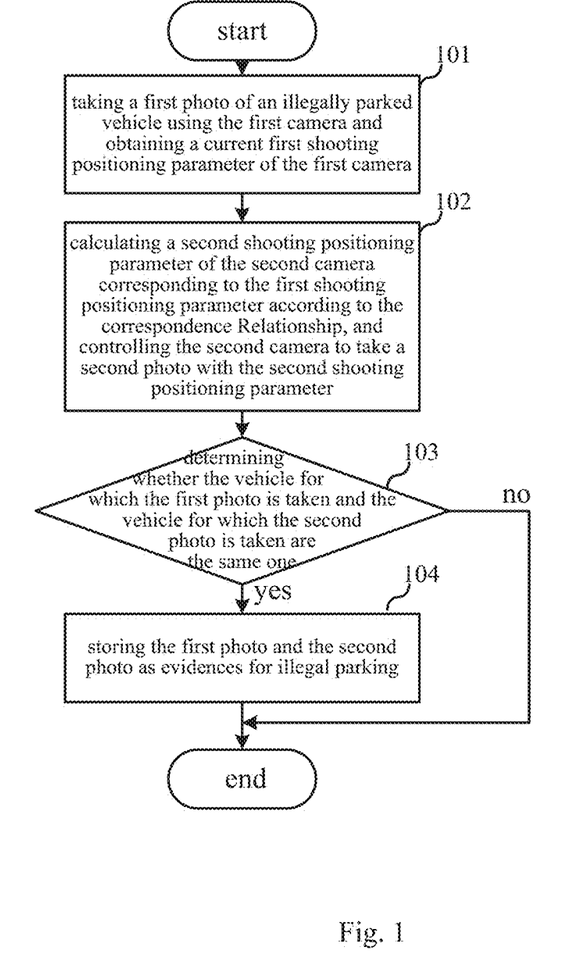
FIG. 1 is a schematic flowchart of a method for obtaining evidences for illegal parking of a vehicle in a first implementation of the present application.

The first implementation of the present application relates to a method for obtaining evidences for illegal parking of a vehicle. FIG. 1 is a schematic flowchart of this method for obtaining evidences for illegal parking of a vehicle.

Specifically, in this method for obtaining evidences for illegal parking of a vehicle, it is required to preset a correspondence relationship between shooting positioning parameters of a first camera and a second camera, as shown in FIG. 1, the method includes following steps.

In step 101, a first photo of an illegally parked vehicle is taken using the first camera and a current first shooting positioning parameters of the first camera are obtained.

The shooting positioning parameters refer to shooting parameters that enables a photo of an object at a certain spatial coordinate in a shooting area to be taken by a camera. For example, for a Pan Tilt Zoom (PTZ) camera, the shooting positioning parameters include the horizontal rotational angle, pitch angle of a camera and the like.

In the following step 102, a second shooting positioning parameter of the second camera corresponding to the first shooting positioning parameter is calculated according to the correspondence relationship, and the second camera is controlled to take a second photo with the second shooting positioning parameter, wherein, the first photo is a photo of a vehicle head and the second photo is a photo of a vehicle rear, or the first photo is a photo of a vehicle rear and the second photo is a photo of a vehicle head.

In following step 103, it is determined whether the vehicle for which the first photo is taken and the vehicle for which the second photo is taken are the same one.

This step 103 can be achieved by various ways. For example, in a preferable embodiment, this step 103 includes following sub-steps:

Based on the image analysis technique, at least a pair of vehicle identification features are extracted from the first photo and the second photo respectively; if the at least one pair of vehicle identification features are identical, the vehicles in the first photo and the second photo are the same one, wherein, the vehicle identification features include the license plate number, the vehicle color, the vehicle brand information etc.

It can be understood that in other embodiments of the present application, it is also possible to determine whether the vehicles in the two photos are the same one, according to other conditions, for example, by tracking and shooting this vehicle to determine whether the vehicle in the video frames taken by the two cameras subsequently is the same one.

If the determining result is that the vehicle for which the first photo is taken and the vehicle for which the second photo is taken are the same one in step 103, then step 104 is executed; otherwise the process completes.

In step 104, the first photo and the second photo are stored as evidences for illegal parking, wherein the evidences may include other information such as license plate information, vehicle cab features and the like according to actual conditions. The license plate and vehicle cab features may be obtained from the first photo and the second photo by image analysis.

Thereafter, the process completes.

Moreover, it can be understood that since the first photo taken by the first camera, after the first camera detects an illegally parked vehicle, may not be a clear photo of the head or rear of the illegally parked vehicle (with an unclear license plate), it is required to adjust other shooting parameters such as the amplification ratio, exposure rate and so on, in order to take a clear photo that can be used as evidences for illegal parking. For example, in a preferable embodiment, after the step 101, the method further includes following steps:

determining whether the resolution of the license plate in the first photo is lower than a first predetermined threshold;

if resolution of a license plate in the first photo is lower than a first predetermined threshold, adjusting focal distance of the first camera and taking, with the first shooting positioning parameter, a third photo in which the resolution of the license plate is greater than that in the first photo.

Similarly, there may be the same problem with the photo taken by the second camera. Therefore, in a preferable embodiment, after the above step 102, the method further includes following steps:

determining whether the resolution of the license plate in the second photo is lower than a second predetermined threshold;

if the resolution of the license plate in the second photo is lower than a second predetermined threshold, adjusting focal distance of the second camera and taking, with the second shooting positioning parameter, a fourth photo in which the resolution of the license plate is greater than that in the second photo.

If the resolutions of the license plates in the first photo and the second photo do not comply with the predetermined parameters and a third photo and a fourth photo was taken by the first camera and the second camera respectively, in the above step 103, it is possible to determine whether the vehicles in the third photo and the fourth photo are the same one based on these two photos. Further, in the above step 104, the third photo and the fourth photo are stored as the evidences for illegal parking instead of the first photo and the second photo.

Moreover, it can be understood that the step of taking the third photo and the fourth photo may be executed before the above step 103 or when the step 103 is executed. For example, in another preferable embodiment, the above step 103 includes following sub-steps:

determining whether the resolution of the license plate in the first photo is lower than a first predetermined threshold, and determining whether the resolution of the license plate in the second photo is lower than a second predetermined threshold;

if the resolution of the license plate in the first photo is lower than a first predetermined threshold and the resolution of the license plate in the second photo is lower than a second predetermined threshold, adjusting the focal distance of the first camera and taking, with the first shooting positioning parameter, a third photo in which the resolution of the license plate is greater than that in the first photo, and adjusting the focal distance of the second camera and taking, with the second shooting positioning parameter, a fourth photo in which the resolution of the license plate is greater than that in the second photo, and determining whether the vehicles in the third photo and the fourth photo are the same one based on these two photos;

if the resolution of the license plate in the first photo is not lower than a first predetermined threshold and the resolution of the license plate in the second photo is not lower than a second predetermined threshold, or the results are partially not (i.e., the resolution of the license plate in the first photo is lower than the first predetermined threshold while the resolution of the license plate in the second photo is greater than or equal to the second predetermined threshold, or in the opposite, the resolution of the license plate in the first photo is not lower than the first predetermined threshold while the resolution of the license plate in the second photo is lower than the second predetermined threshold), then determining whether the photos of the vehicle head and tail belong to the same vehicle, based on the photos whose resolutions are respectively greater than the first predetermined threshold and the second predetermined threshold. For example, if the resolution of the license plate in the first photo is lower than the first predetermined threshold while the resolution of the license plate in the second photo is greater than or equal to the second predetermined threshold, then it is determined whether the vehicles in the third photo and the second photo are the same one; if the resolution of the license plate in the second photo is lower than the second predetermined threshold while the resolution of the license plate in the first photo is greater than or equal to the first predetermined threshold, then it is determined whether the vehicles in the first photo and the fourth photo are the same one.

It can be understood that, in the present application, the evidences for illegal parking include the photo in which resolutions of license plates are greater than or equal to the first predetermined threshold and the photo in which resolutions of license plates are greater than or equal to the second predetermined threshold, and whether the photos of the vehicle head and the vehicle rear belong to the same vehicle is also determined based on these photos.

Moreover, it can be understood that the correspondence relationship between the shooting positioning parameters of the first camera the second camera may be set by various ways. For example, in a preferable embodiment of the present application, the correspondence relationship between the shooting positioning parameters of the first camera and the second camera is as follows:

$$\begin{bmatrix} \frac{h \times \sin(T)}{\tan(P)} & -\frac{h \times \cos(T)}{\tan(P)} & 1 & 0 \\ \frac{h \times \cos(T)}{\tan(P)} & \frac{h \times \sin(T)}{\tan(P)} & 0 & 1 \end{bmatrix} \begin{bmatrix} \alpha \cos \theta \\ \alpha \sin \theta \\ a \\ b \end{bmatrix} = \begin{bmatrix} \frac{h' \times \sin(T')}{\tan(P')} \\ \frac{h' \times \cos(T')}{\tan(P')} \end{bmatrix},$$

wherein h represents height of the first camera from ground, T represents pitch angel of the first camera, P represents horizontal rotational angle of the first camera, h' represents height of the second camera from ground, T' represents pitch angle of the second camera, P' represents horizontal rotational angle of the second camera, a, b, α and θ are determined by the following equation:

$$\begin{bmatrix} x_1 & -y_1 & 1 & 0 \\ y_1 & x_1 & 0 & 1 \\ x_2 & -y_2 & 1 & 0 \\ y_2 & x_2 & 0 & 1 \\ x_3 & -y_3 & 1 & 0 \\ y_3 & x_3 & 0 & 1 \\ \vdots & \vdots & \vdots & \vdots \end{bmatrix} \begin{bmatrix} \alpha \cos \theta \\ \alpha \sin \theta \\ a \\ b \end{bmatrix} = \begin{bmatrix} x'_1 \\ y'_1 \\ x'_2 \\ y'_2 \\ x'_3 \\ y'_3 \\ \vdots \end{bmatrix},$$

wherein $(x_1,y_1)$, $(x_2,y_2)$ and $(x_3,y_3)$ are three given coordinates in a three-dimensional rectangular coordinate system established by taking a projection of the first camera on the ground as an origin, $(x_1',y_1')$, $(x_2',y_2')$, and $(x_3',y_3')$ are three given coordinates in a three-dimensional rectangular coordinate system established by taking a projection of the second camera on the ground as an origin. The relationship between coordinates and the shooting positioning parameters of corresponding cameras includes:

$$x = \frac{h \times \sin(T)}{\tan(P)}, y = \frac{h \times \cos(T)}{\tan(P)}, x' = \frac{h' \times \sin(T')}{\tan(P')}, y' = \frac{h' \times \cos(T')}{\tan(P')}.$$

Moreover, it can be understood that cameras in various implementations of the present application may be those cameras whose shooting directions may be adjusted at any time, such as PTZ cameras, dome cameras and the like.

By pre-establishing the correspondence relationship between the shooting positioning parameters of two cameras, it is possible to control one of the cameras to adjust the shooting direction in case that the other camera finds an illegally parked vehicle, so as to shoot the illegally parked vehicle simultaneously or within a predetermined time period, to thereby obtain photos of the head and rear of the illegally parked vehicle, wherein the photos obtained as evidences can satisfy the standards for penalizing illegal parking in the industry standards.

Figure 2:
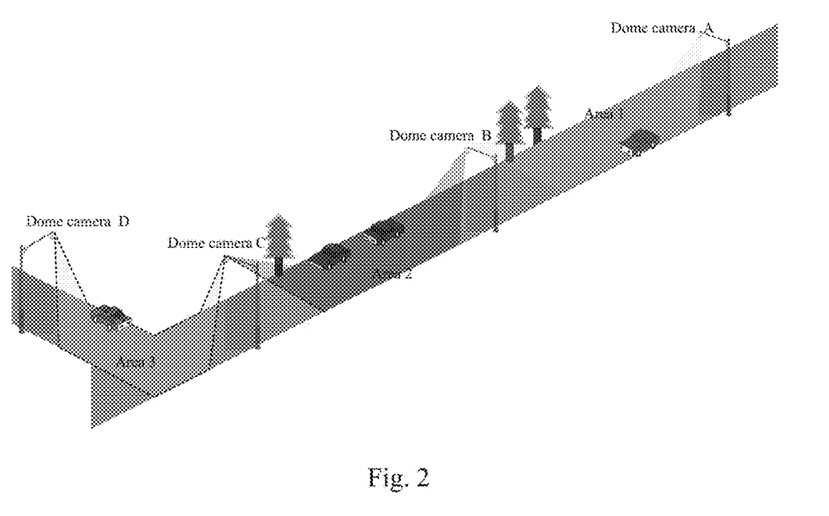
FIG. 2 is a schematic diagram of the setting up of cameras in a second implementation of the present application.

The second implementation of the present application relates to a method for obtaining evidences for illegal parking of a vehicle. Specifically, cameras in this implementation are PTZ dome cameras. In actual implementation, in the setting up of cameras as shown in FIG. 2, a plurality of dome cameras are set up in a road segment or even a road network, wherein each dome camera includes one camera, and the two dome cameras interact with each other such that it is possible to snapshot illegally parked vehicles from front and behind simultaneously. Dome cameras A and B monitor area 1 jointly. At a certain moment, dome camera A or B snapshots head or rear of an illegally parked vehicle in this area after detecting this vehicle, and can calculate corresponding PT coordinates (i.e., shooting positioning parameters, wherein P represents the horizontal rotational angle of a PTZ dome camera and T represents its pitch angle) by a certain geometric transformation, finish the snapshot of the vehicle rear or head, and finally a complete set of evidences is formed.

Taking two dome cameras interacting with each other as an example, the method for obtaining evidences for illegal parking of a vehicle in this implementation includes following steps:

1. setting shooting parameters between two dome cameras, i.e., a PT coordinate of one dome camera (the dome camera is directed to a certain point on the ground) is given, the PT coordinate of the other dome camera can be obtained (the dome camera is directed to the same point on the ground).

Figure 3:
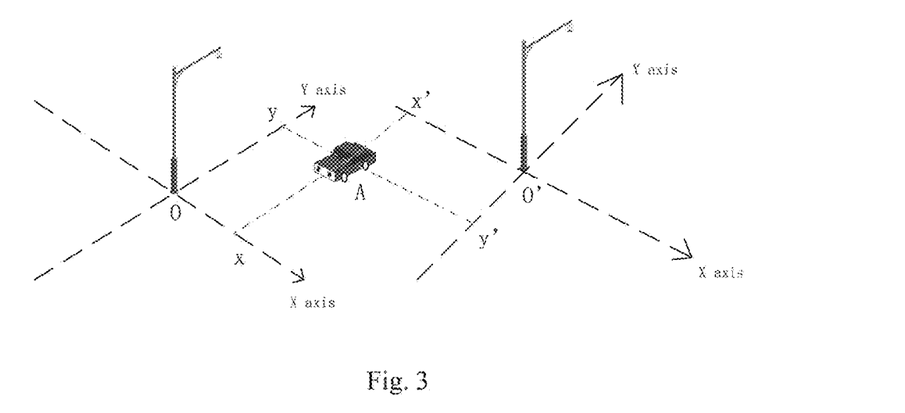
FIG. 3 is a schematic diagram of a coordinate system established for presetting shooting positioning parameters of two dome cameras in the second implementation of the present application.

Coordinates of the same point on the ground plane in different three-dimensional rectangular coordinate systems satisfy a linear positive transformation as follows:

$$\alpha \begin{bmatrix} \cos\theta & -\sin\theta \\ \sin\theta & \cos\theta \end{bmatrix} \begin{bmatrix} x \\ y \end{bmatrix} + \begin{bmatrix} a \\ b \end{bmatrix} = \begin{bmatrix} x' \\ y' \end{bmatrix}$$

wherein, $\alpha$ represents amplification coefficient, $\theta$ represents rotational coefficient, a and b represent translational coefficients. As shown in FIG. 3, (x,y) can be considered as coordinates of a point A on the ground plane in a three-dimensional rectangular coordinate system with the projection position 0 on the ground of an alerting dome camera (i.e. the first camera) as an origin, (x',y') is coordinates of the point A in a three-dimensional rectangular coordinate system with the projection position 0' on the ground of a linked dome camera (i.e. the second camera) as an origin.

The three-dimensional rectangular coordinate system based on each dome camera may be obtained from the PT coordinate corresponding to each point:

$$x = \frac{h \times \sin(T)}{\tan(P)}, y = \frac{h \times \cos(T)}{\tan(P)}$$

wherein, P represents horizontal rotational angle of the alerting dome camera, T represents pitch angle of the alerting dome camera, h represents height of the alerting dome camera from ground. Each time the dual dome cameras (including the alerting dome camera and the linked dome camera) set one point, the coordinates of this point on the ground in the two coordinate systems (x,y) and (x',y') can be obtained. It can be obtained from the above equations that:

$$\begin{bmatrix} x & -y & 1 & 0 \\ y & x & 0 & 1 \end{bmatrix} \begin{bmatrix} \alpha\cos\theta \\ \alpha\sin\theta \\ a \\ b \end{bmatrix} = \begin{bmatrix} x' \\ y' \end{bmatrix}$$

wherein a, b, $\alpha$ and $\theta$ are unknowns. It can be known from the principle of the least square method that calculating these unknowns requires at least two pairs of points. Each time a pair of points is added, this relationship may be expanded as follows:

$$\begin{bmatrix} x_1 & -y_1 & 1 & 0 \\ y_1 & x_1 & 0 & 1 \\ x_2 & -y_2 & 1 & 0 \\ y_2 & x_2 & 0 & 1 \\ x_3 & -y_3 & 1 & 0 \\ y_3 & x_3 & 0 & 1 \\ \vdots & \vdots & \vdots & \vdots \end{bmatrix} \begin{bmatrix} \alpha\cos\theta \\ \alpha\sin\theta \\ a \\ b \end{bmatrix} = \begin{bmatrix} x_1' \\ y_1' \\ x_2' \\ y_2' \\ x_3' \\ y_3' \\ \vdots \end{bmatrix},$$

Finally, a, b, $\alpha$ and $\theta$ are obtained by the least square method and the setting is finished by now.

When coordinates of an alerting target is received from the alerting dome camera, it is only required to substitute these coordinates into the above equation to calculate the coordinate of the linked dome camera in the three-dimensional rectangular coordinate system, and then the PT coordinates of the linked dome camera are obtain by coordinate transformation.

2. Detecting and Snapshotting Illegal Parking Events
   (1) the judgement of illegal parking behaviors
   extracting the vehicle from an image with the target detecting techniques based on video analysis, analyzing motion behaviors of a target in a consecutive frame image, and determining whether the target breaks rules; and sending the coordinate of the target after illegal parking of the target.

(2) controlling the dual dome cameras to snapshot configuring snapshotting rules according to law enforcement features: panoramic photos, close shot photos or close-up photos; the number of photos required to be snapshot for each snapshot task, time interval between every two snapshots and the like.

Three tasks are mainly completed after configuring:

A. the alerting dome camera snapshotting,

B. the linked dome camera snapshotting,

C. comparing the vehicle information snapshot by the alerting dome camera and the linked dome camera, that is, comparing the photos taken by the two dome cameras and determining whether the vehicles are the same one. The main contents compared include information such as license plate number of the vehicle, color of the vehicle and the like.

Figure 4:
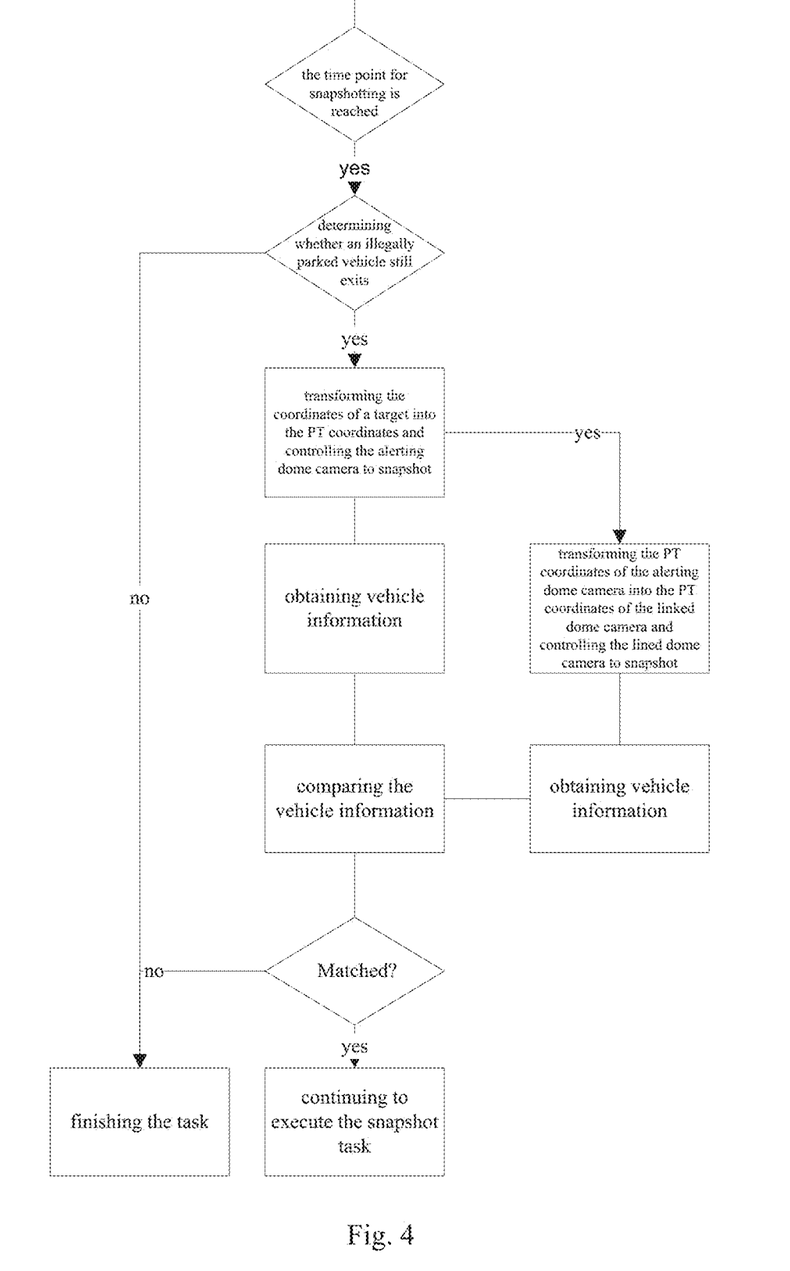
FIG. 4 a flowchart of a method for controlling dual dome cameras to snapshot an illegally parked vehicle in the second implementation of the present application.

As shown in FIG. 4, a specific procedure may include determining whether the time point for snapshotting is reached, and if the time point for snapshotting is reached, further determining whether an illegally parked vehicle still exists. If the illegally parked vehicle does not exist, then finish the task. If the illegally parked vehicle still exists, then the coordinates of a target is transformed into the PT coordinates of a dome camera and the alerting dome camera is controlled to snapshot, and vehicle information is obtained by snapshotting of the alerting dome camera; at the same time, if it is determined that a linked dome camera is required to snapshot, the PT coordinates of the alerting dome camera is transformed into the PT coordinates of the linked dome camera and the linked dome camera is controlled to snapshot, and vehicle information is obtained by snapshotting of the linked dome camera. The vehicle information obtained by snapshotting of the alerting dome camera is compared with the vehicle information obtained by snapshotting of the linked dome camera, if matched each other, continue to execute the snapshot task, otherwise finish the task. Determining whether the illegally parked vehicle exists may be achieved by the ways such as feature matching and the like. The determining whether the target existing at the alerting position is consistent with the alerting target in the current photo can also be achieved by tracking the target for a long time.

Figure 5:
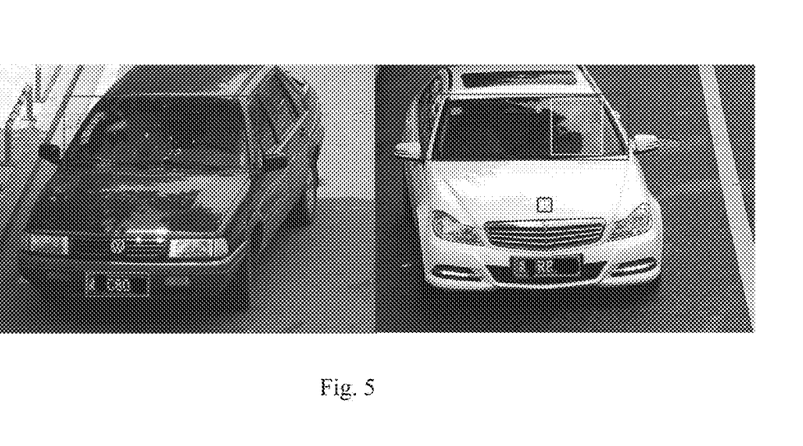
FIG. 5 is a schematic diagram of collecting vehicle information based on photos of an illegally parked vehicle in the second implementation of the present application.

(3) Collecting Vehicle Information

The collection of vehicle information mainly includes following three steps:

A. extracting the license plate of a target vehicle in a close shot photo and identifying the license plate number;

B. after identifying the license plate number, performing area expanding on the basis of coordinate of the license plate, and obtaining the vehicle brand information by feature analysis on the expanded area, and obtaining the vehicle color information by a color model;

C. determining whether the current feature is the feature of the front of the vehicle in the close shot photo and the close-up photo according to the position information of the license plate and the vehicle brand, and if it is the front of a vehicle, positioning the vehicle window by vehicle window detecting techniques, and performing human detection at the right half of the vehicle window to determine if there is a driver in the cab, as shown in FIG. 5.

Figure 6:
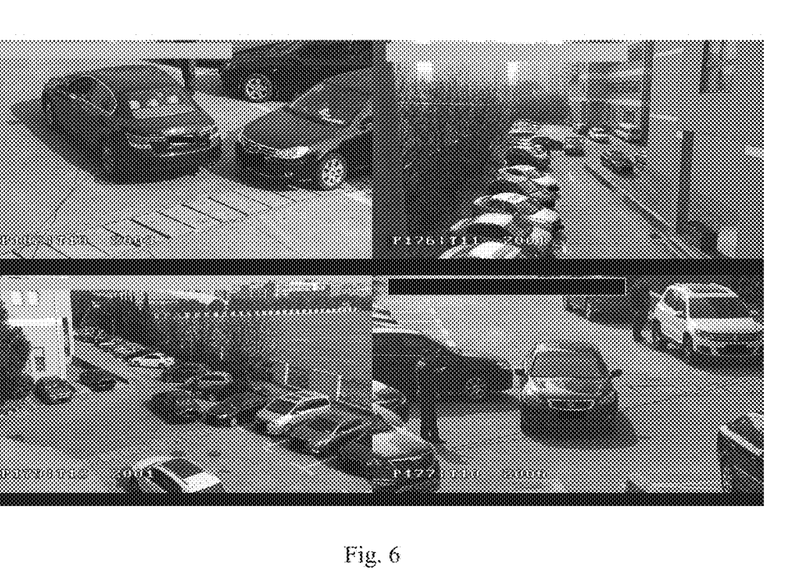
FIG. 6 is a combined diagram obtained by combining photos obtained during the process of obtaining evidences for illegal parking of a vehicle in the second implementation of the present application.

(4) storing the processed photos of the illegally parked vehicle as evidences, that is, after completing a snapshot task for illegal parking according to preset rules, all of the snapshot photos of the target are combined and uploaded to a specified device. As shown in FIG. 6, it represents evidences obtained by combining the photos obtained during the process of obtaining evidences for illegal parking.

Implementations of various methods of the present application may be realized in the ways such as software, hardware, firmware and so on. No matter how the present application is realized (in software, hardware or firmware ways), instruction codes can be stored in any type of computer accessible memory (e.g., permanent or modifiable, volatile or non-volatile, solid-state or non-solid-state, fixed or removable medium, etc.). Similarly, memory may be for example Programmable Array Logic (PAL), Random Access Memory (RAM), Programmable Read Only Memory (PROM), Read-Only Memory (ROM), Electrically Erasable Programmable ROM (EEPROM), disc, optical disk, Digital Versatile Disc (DVD) and the like.

Figure 7:
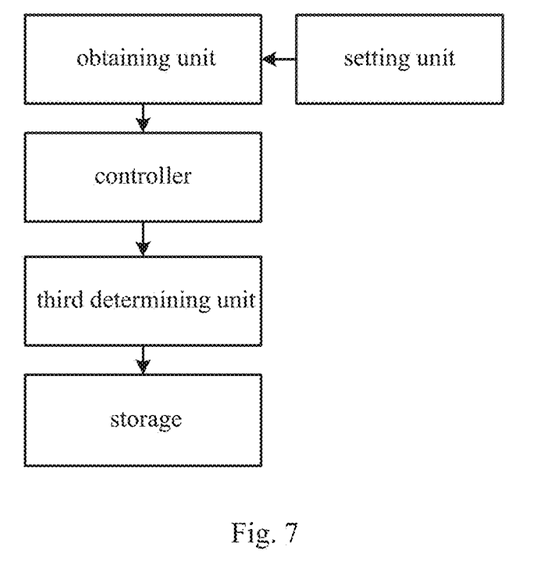
FIG. 7 is a schematic structure diagram of a device for obtaining evidences for illegal parking of a vehicle in a third implementation of the present application.

The third implementation of the present application relates to a device for obtaining evidences for illegal parking of a vehicle. FIG. 7 is a schematic structural diagram of this device for obtaining evidences for illegal parking of a vehicle.

Specifically, as shown in FIG. 7, the device for obtaining evidences for illegal parking of a vehicle includes:

a setting unit is configured to preset a correspondence relationship between shooting positioning parameters of a first camera and a second camera;

an obtaining unit is configured to control the first camera to take a first photo of the illegally parked vehicle and obtain a current first shooting positioning parameter of the first camera;

a controller is configured to calculate a second shooting positioning parameter of the second camera corresponding to the first shooting positioning parameter according to the correspondence relationship and control the second camera to take a second photo with the second shooting positioning parameter, wherein the first photo is a photo of a vehicle head and the second photo is a photo of a vehicle rear, or the first photo is a photo of a vehicle rear and the second photo is a photo of a vehicle head;

a third determining unit is configured to determine whether the vehicle for which the first photo is taken and the vehicle for which the second photo is taken are the same one; and a storage is configured to store the first photo and the second photo as the evidences for illegal parking when determining result of the third determining unit is yes.

Moreover, it can be understood that since the first photo, taken by the first camera after the first camera detected the illegally parked vehicle, may not be a clear photo of head or rear of the illegally parked vehicle (with an unclear license plate), and the second photo taken by the second camera in response to the shooting of the first camera may also not be a clear photo of the head or rear of the illegally parked vehicle in certain situations, it is required to adjust other shooting parameters again such as the amplification ratio, exposure rate and so on, in order to take a clear photo that can be used as an illegal parking evidence. For example, in a preferable embodiment, the device for obtaining evidences further includes following units:

a first determining unit is configured to determine whether resolution of a license plate in the first photo is lower than a first predetermined threshold;

a first shooting unit is configured to adjust focal distance of the first camera when determining result of the first determining unit is yes, and take, with the first shooting positioning parameter, a third photo in which the resolution of the license plate is greater than a first predetermined threshold;

a second determining unit is configured to determine whether resolution of the license plate in the second photo is lower than a second predetermined threshold; and a second shooting unit is configured to adjust focal distance of the second camera when determining result of the second determining unit is yes and take, with the second shooting positioning parameter, a fourth photo in which the resolution of the license plate is greater than the second predetermined threshold.

Moreover, the above correspondence relationship between the shooting positioning parameters of the first camera and the second camera is as follows:

$$\begin{bmatrix} \frac{h \times \sin(T)}{\tan(P)} & -\frac{h \times \cos(T)}{\tan(P)} & 1 & 0 \\ \frac{h \times \cos(T)}{\tan(P)} & \frac{h \times \sin(T)}{\tan(P)} & 0 & 1 \end{bmatrix} \begin{bmatrix} \alpha \cos \theta \\ \alpha \sin \theta \\ a \\ b \end{bmatrix} = \begin{bmatrix} \frac{h' \times \sin(T')}{\tan(P')} \\ \frac{h' \times \cos(T')}{\tan(P')} \end{bmatrix},$$

wherein h represents height of the first camera from ground, T represents pitch angel of the first camera, P represents horizontal rotational angle of the first camera, h' represents height of the second camera from ground, T' represents pitch angle of the second camera, P' represents horizontal rotational angle of the second camera, a, b, α and θ are determined by the following equation:

$$\begin{bmatrix} x_1 & -y_1 & 1 & 0 \\ y_1 & x_1 & 0 & 1 \\ x_2 & -y_2 & 1 & 0 \\ y_2 & x_2 & 0 & 1 \\ x_3 & -y_3 & 1 & 0 \\ y_3 & x_3 & 0 & 1 \\ \vdots & \vdots & \vdots & \vdots \end{bmatrix} \begin{bmatrix} \alpha \cos \theta \\ \alpha \sin \theta \\ a \\ b \end{bmatrix} = \begin{bmatrix} x'_1 \\ y'_1 \\ x'_2 \\ y'_2 \\ x'_3 \\ y'_3 \\ \vdots \end{bmatrix},$$

wherein $(x_1,y_1)$ $(x_2,y_2)$, and $(x_3,y_3)$ are three given coordinates in a three-dimensional rectangular coordinate system established by taking a projection of the first camera on the ground as an origin, $(x_1',y_1')$, $(x_2',y_2')$ and $(x_3',y_3')$ are three given coordinates in a three-dimensional rectangular coordinate system established by taking a projection of the second camera on the ground as an origin, the relationship between coordinates and the shooting positioning parameters of a corresponding camera includes:

$$x = \frac{h \times \sin(T)}{\tan(P)}, \quad y = \frac{h \times \cos(T)}{\tan(P)}, \quad x' = \frac{h' \times \sin(T')}{\tan(P')}, \quad y' = \frac{h' \times \cos(T')}{\tan(P')}.$$

It can be understood that the correspondence relationship between the shooting positioning parameters of the two cameras can be calculated in other ways in other implementations of the present application.

The first implementation is a method implementation corresponding to this implementation and this implementation may be implemented cooperatively with the first implementation. Relative technical details mentioned in the first implementation are still valid in this implementation and are not described here in order to reduce repetition. Accordingly, relative technical details mentioned in this implementation may also be used in the first implementation.

It is noted that various units mentioned in various device implementations of the present application are all logical units, each of which may physically be a physical unit, or be a part of a physical unit, or be realized in the combination of a number of physical units. The physical implementations of these logical units per se are not the most important, instead, the combination of functions implemented by these logical units is a key point for resolving the technical problems proposed in the present application. Moreover, in order to highlight the creative parts of the present application, units that are less related with the solutions of the technical problems proposed in the present application are not incorporated in the above various device implementations, which does not imply that other units do not exist in the above device implementations.

In order to achieve the above objects, embodiments of the present application also provide a storage medium, wherein the storage medium is configured to store an application, and the application is executed to perform the method for obtaining evidences for illegal parking of a vehicle described in the embodiments of the present application. Here, the method for obtaining evidences for illegal parking of a vehicle in the present application includes:

taking a first photo of an illegally parked vehicle by the first camera and obtaining a current first shooting positioning parameter of the first camera;

calculating a second shooting positioning parameter of the second camera corresponding to the first shooting positioning parameter according to the correspondence relationship and controlling the second camera to take a second photo with the second shooting positioning parameter, wherein the first photo is a photo of a vehicle head and the second photo is a photo of a vehicle rear, or the first photo is a photo of a vehicle rear and the second photo is a photo of a vehicle head;

determining whether the vehicle for which the first photo is taken and the vehicle for which the second photo is taken are the same one by an image analysis technique; and if the vehicle for which the first photo is taken and the vehicle for which the second photo is taken are the same one, storing the first photo and the second photo as evidences for illegal parking.

In order to achieve the above objects, embodiments of the present application also provide an application program, wherein the application program is executed to perform the method for obtaining evidences for illegal parking of a vehicle described in the present application. The method for obtaining evidences for illegal parking of a vehicle in the present application includes:

taking a first photo of an illegally parked vehicle by the first camera and obtaining a current first shooting positioning parameter of the first camera;

calculating a second shooting positioning parameter of the second camera corresponding to the first shooting positioning parameter according to the correspondence relationship and controlling the second camera to take a second photo with the second shooting positioning parameter, wherein the first photo is a photo of a vehicle head and the second photo is a photo of a vehicle rear, or the first photo is a photo of a vehicle rear and the second photo is a photo of a vehicle head;

determining whether the vehicle for which the first photo is taken and the vehicle for which the second photo is taken are the same one by an image analysis technique; and if the vehicle for which the first photo is taken and the vehicle for which the second photo is taken are the same one, storing the first photo and the second photo as evidences for illegal parking.

In order to achieve the above objects, embodiments of the present application also provide an evidence obtaining system including a first camera and a second camera, wherein the first camera is configured to take a first photo of an illegally parked vehicle, the evidence obtaining system further includes:

a processor, a memory, communication interfaces and a bus, wherein the processor, the memory and the communication interfaces connect to and communicate with each other via the bus;

the processor may be a Central Processing Unit (CPU) or an Application specific Integrated Circuit (ASIC) or one or more integrated circuits configured for implementing the embodiments of the present application;

the memory is configured to store executable program codes, and may include a high speed RAM memory or may include a non-volatile memory such as at least one disk memory;

the processor is configured to execute the program corresponding to the executable program code by reading the executable program code stored in the memory to perform:

obtaining a current first shooting positioning parameter of the first camera;

calculating a second shooting positioning parameter of the second camera corresponding to the first shooting positioning parameter according to the correspondence relationship and controlling the second camera to take a second photo with the second shooting positioning parameter, wherein the first photo is a photo of a vehicle head and the second photo is a photo of a vehicle rear, or the first photo is a photo of a vehicle rear and the second photo is a photo of a vehicle head;

determining whether the vehicle for which the first photo is taken and the vehicle for which the second photo is taken are the same one by an image analysis technique; and if the vehicle for which the first photo is taken and the vehicle for which the second photo is taken are the same one, storing the first photo and the second photo as evidences for illegal parking.

Specific implementations of the above steps may refer to implementations of corresponding steps of preceding embodiments and are omitted here.

It should be noted that the relation terms in the claims and description of the present patent such as "first" and "second" or the like are only used to differ one instance or operation from another instance or operation, and there may be no requirements or implies that there are actual relation or order like this among these instances or operations. Moreover, terms, like "include", "comprise" or other variants, are intended to cover a non-exclusive inclusion, such that processes, methods, objects or devices including a series of elements not only include those elements, but also include other elements not listed specifically or the intrinsic elements included in these processes, methods, objects, or devices. Without more limitations, elements limited by sentences "include(s) a" don't exclude that there are other identical elements in the processes, methods, objects, or devices which include these elements.

While the present application has been illustrated and described with reference to certain preferable implementations of the present application, those skilled in the art would understand that various modifications may be made to it in form and detail without departing from the spirit and scope of the present application.

The invention claimed is:

1. A method for obtaining evidences for illegal parking of a vehicle, wherein, a correspondence relationship between shooting positioning parameters of a first camera and a second camera is preset, the method comprises following steps;

taking a first photo of an illegally parked vehicle using the first camera and obtaining a current first shooting positioning parameter of the first camera;

calculating a second shooting positioning parameter of the second camera corresponding to the first shooting positioning parameter according to the correspondence relationship, and controlling the second camera to take a second photo with the second shooting positioning parameter, wherein the first photo is a photo of a vehicle head and the second photo is a photo of a vehicle rear, or the first photo is a photo of a vehicle rear and the second photo is a photo of a vehicle head;

determining whether the vehicle for which the first photo is taken and the vehicle for which the second photo is taken are the same one by an image analysis technique; and if the vehicle for which the first photo is taken and the vehicle for which the second photo is taken are the same one, storing the first photo and the second photo as evidences for illegal parking.

2. The method for obtaining evidences for illegal parking of a vehicle according to claim 1, wherein, after taking a first photo of an illegally parked vehicle using the first camera, the method further comprises following steps:

if resolution of a license plate in the first photo is lower than a first predetermined threshold, adjusting focal distance of the first camera and taking, with the first shooting positioning parameter, a third photo in which resolution of a license plate is greater than that in the first photo.

3. The method for obtaining evidences for illegal parking of a vehicle according to claim 1, wherein, after controlling the second camera to take a second photo with the second shooting positioning parameter, the method further comprises following steps:

if resolution of a license plate in the second photo is lower than a second predetermined threshold, adjusting focal distance of the second camera and taking, with the second shooting positioning parameter, a fourth photo in which resolution of a license plate is greater than that in the second photo.

4. The method for obtaining evidences for illegal parking of a vehicle according to claim 1, wherein, the step of storing the first photo and the second photo as evidences for illegal parking comprises following a sub-step:

obtaining a license plate number and cab features from the first photo or the second photo based on the image analysis technique;

wherein the evidences for illegal parking comprises: the first photo, the second photo, the license plate number and the cab features.

5. The method for obtaining evidences for illegal parking of a vehicle according to claim 1, wherein, the correspondence relationship between the shooting positioning parameters of the first camera and the second camera is as follows:

$$\begin{bmatrix} \dfrac{h \times \sin(T)}{\tan(P)} & -\dfrac{h \times \cos(T)}{\tan(P)} & 1 & 0 \\ \dfrac{h \times \cos(T)}{\tan(P)} & \dfrac{h \times \sin(T)}{\tan(P)} & 0 & 1 \end{bmatrix} \begin{bmatrix} \alpha \cos \theta \\ \alpha \sin \theta \\ a \\ b \end{bmatrix} = \begin{bmatrix} \dfrac{h' \times \sin(T')}{\tan(P')} \\ \dfrac{h' \times \cos(T')}{\tan(P')} \end{bmatrix},$$

wherein h represents height of the first camera from ground, T represents pitch angel of the first camera, P represents horizontal rotational angle of the first camera, h' represents height of the second camera from ground, T'' represents pitch angle of the second camera, P' represents horizontal rotational angle of the second camera, a, b, α and θ are determined by the following equation:

$$\begin{bmatrix} x_1 & -y_1 & 1 & 0 \\ y_1 & x_1 & 0 & 1 \\ x_2 & -y_2 & 1 & 0 \\ y_2 & x_2 & 0 & 1 \\ x_3 & -y_3 & 1 & 0 \\ y_3 & x_3 & 0 & 1 \\ \vdots & \vdots & \vdots & \vdots \end{bmatrix} \begin{bmatrix} \alpha \cos \theta \\ \alpha \sin \theta \\ a \\ b \end{bmatrix} = \begin{bmatrix} x'_1 \\ y'_1 \\ x'_2 \\ y'_2 \\ x'_3 \\ y'_3 \\ \vdots \end{bmatrix},$$

wherein $(x_1,y_1)$, $(x_2,y_2)$, and $(x_3,y_3)$ are three given coordinates in a three-dimensional rectangular coordinate system established by taking a projection of the first camera on the ground as an origin, $(x_1',y_1')$, $(x_2',y_2')$, and $(x_3',y_3')$ are three given coordinates in a three-dimensional rectangular coordinate system established by taking a projection of the second camera on the ground as an origin, the relationship between the coordinates and the shooting positioning parameters of a corresponding camera comprises:

$$x = \frac{h \times \sin(T)}{\tan(P)}, \; y = \frac{h \times \cos(T)}{\tan(P)}, \; x' = \frac{h' \times \sin(T')}{\tan(P')}, \; y' = \frac{h' \times \cos(T')}{\tan(P')}.$$

6. A non-transitory storage medium, wherein the storage medium is configured to store an application to obtain evidences for illegal parking of a vehicle,
wherein the application is executed to preset a correspondence relationship between shooting positioning parameters of a first camera and a second camera;
control the first camera to take a first photo of an illegally parked vehicle and obtain a current first shooting positioning parameter of the first camera;
calculate a second shooting positioning parameter of the second camera corresponding to the first shooting positioning parameter according to the correspondence relationship, and control the second camera to take a second photo with the second shooting positioning parameter, wherein the first photo is a photo of a vehicle head and the second photo is a photo of a vehicle rear, or the first photo is a photo of a vehicle rear and the second photo is a photo of a vehicle head;
determine whether the vehicle for which the first photo is taken and the vehicle for which the second photo is taken are the same one by an image analysis technique; and
store the first photo and the second photo as evidences for illegal parking when determining result of the third determining unit is true.

7. An evidence obtaining system, comprising; a first camera and a second camera, wherein the first camera is configured to take a first photo of an illegally parked vehicle, the evidence obtaining system further comprises;
a processor, a memory, communication interfaces and a bus,
wherein
the processor, the memory and the communication interfaces connect to and communicate with each other via the bus;
the memory is configured to store executable program codes;
the processor is configured to execute programs corresponding to the executable program codes by reading the executable program codes stored in the memory to perform:
obtaining a current first shooting positioning parameter of the first camera;
calculating a second shooting positioning parameter of the second camera corresponding to the first shooting positioning parameter according to the correspondence relationship and controlling the second camera to take a second photo with the second shooting positioning parameter, wherein the first photo is a photo of a vehicle head and the second photo is a photo of a vehicle rear, or the first photo is a photo of a vehicle rear and the second photo is a photo of a vehicle head;
determining whether the vehicle for which the first photo is taken and the vehicle for which the second photo is taken are the same one by an image analysis technique; and
if the vehicle for which the first photo is taken and the vehicle for which the second photo is taken are the same one, storing the first photo and the second photo as evidences for illegal parking.

8. The method for obtaining evidences for illegal parking of a vehicle according to claim 2, wherein, the correspondence relationship between the shooting positioning parameters of the first camera and the second camera is as follows:

$$\begin{bmatrix} \dfrac{h \times \sin(T)}{\tan(P)} & -\dfrac{h \times \cos(T)}{\tan(P)} & 1 & 0 \\ \dfrac{h \times \cos(T)}{\tan(P)} & \dfrac{h \times \sin(T)}{\tan(P)} & 0 & 1 \end{bmatrix} \begin{bmatrix} \alpha \cos \theta \\ \alpha \sin \theta \\ a \\ b \end{bmatrix} = \begin{bmatrix} \dfrac{h' \times \sin(T')}{\tan(P')} \\ \dfrac{h' \times \cos(T')}{\tan(P')} \end{bmatrix},$$

wherein h represents height of the first camera from ground, T represents pitch angel of the first camera, P represents horizontal rotational angle of the first camera, h' represents height of the second camera from ground, T' represents pitch angle of the second camera, P' represents horizontal rotational angle of the second camera, a, b, α and θ are determined by the following equation:

$$\begin{bmatrix} x_1 & -y_1 & 1 & 0 \\ y_1 & x_1 & 0 & 1 \\ x_2 & -y_2 & 1 & 0 \\ y_2 & x_2 & 0 & 1 \\ x_3 & -y_3 & 1 & 0 \\ y_3 & x_3 & 0 & 1 \\ \vdots & \vdots & \vdots & \vdots \end{bmatrix} \begin{bmatrix} \alpha \cos \theta \\ \alpha \sin \theta \\ a \\ b \end{bmatrix} = \begin{bmatrix} x'_1 \\ y'_1 \\ x'_2 \\ y'_2 \\ x'_3 \\ y'_3 \\ \vdots \end{bmatrix},$$

wherein $(x_1,y_1)$, $(x_2,y_2)$, and $(x_3,y_3)$ are three given coordinates in a three-dimensional rectangular coordinate system established by taking a projection of the first camera on the ground as an origin, $(x_1',y_1')$, $(x_2',y_2')$, and $(x_3',y_3')$ are three given coordinates in a three-dimensional rectangular coordinate system established by taking a projection of the second camera on the ground as an origin, the relationship between the coordinates and the shooting positioning parameters of a corresponding camera comprises:

$$x = \frac{h \times \sin(T)}{\tan(P)}, \; y = \frac{h \times \cos(T)}{\tan(P)}, \; x' = \frac{h' \times \sin(T')}{\tan(P')}, \; y' = \frac{h' \times \cos(T')}{\tan(P')}.$$

9. The method for obtaining evidences for illegal parking of a vehicle according to claim 3, wherein, the correspondence relationship between the shooting positioning parameters of the first camera and the second camera is as follows:

$$\begin{bmatrix} \frac{h \times \sin(T)}{\tan(P)} & -\frac{h \times \cos(T)}{\tan(P)} & 1 & 0 \\ \frac{h \times \cos(T)}{\tan(P)} & \frac{h \times \sin(T)}{\tan(P)} & 0 & 1 \end{bmatrix} \begin{bmatrix} \alpha \cos\theta \\ \alpha \sin\theta \\ a \\ b \end{bmatrix} = \begin{bmatrix} \frac{h' \times \sin(T')}{\tan(P')} \\ \frac{h' \times \cos(T')}{\tan(P')} \end{bmatrix},$$

wherein h represents height of the first camera from ground, T represents pitch angel of the first camera, P represents horizontal rotational angle of the first camera, h' represents height of the second camera from ground, T' represents pitch angle of the second camera, P' represents horizontal rotational angle of the second camera, a, b, $\alpha$ and $\theta$ are determined by the following equation:

$$\begin{bmatrix} x_1 & -y_1 & 1 & 0 \\ y_1 & x_1 & 0 & 1 \\ x_2 & -y_2 & 1 & 0 \\ y_2 & x_2 & 0 & 1 \\ x_3 & -y_3 & 1 & 0 \\ y_3 & x_3 & 0 & 1 \\ \vdots & \vdots & \vdots & \vdots \end{bmatrix} \begin{bmatrix} \alpha \cos\theta \\ \alpha \sin\theta \\ a \\ b \end{bmatrix} = \begin{bmatrix} x_1' \\ y_1' \\ x_2' \\ y_2' \\ x_3' \\ y_3' \\ \vdots \end{bmatrix},$$

wherein $(x_1,y_1)$, $(x_2,y_2)$, and $(x_3,y_3)$ are three given coordinates in a three-dimensional rectangular coordinate system established by taking a projection of the first camera on the ground as an origin, $(x_1',y_1')$, $(x_2',y_2')$, and $(x_3',y_3')$ are three given coordinates in a three-dimensional rectangular coordinate system established by taking a projection of the second camera on the ground as an origin, the relationship between the coordinates and the shooting positioning parameters of a corresponding camera comprises:

$$x = \frac{h \times \sin(T)}{\tan(P)}, \; y = \frac{h \times \cos(T)}{\tan(P)}, \; x' = \frac{h' \times \sin(T')}{\tan(P')}, \; y' = \frac{h' \times \cos(T')}{\tan(P')}.$$

10. The method for obtaining evidences for illegal parking of a vehicle according to claim 4, wherein, the correspondence relationship between the shooting positioning parameters of the first era and the second camera is as follows:

$$\begin{bmatrix} \frac{h \times \sin(T)}{\tan(P)} & -\frac{h \times \cos(T)}{\tan(P)} & 1 & 0 \\ \frac{h \times \cos(T)}{\tan(P)} & \frac{h \times \sin(T)}{\tan(P)} & 0 & 1 \end{bmatrix} \begin{bmatrix} \alpha \cos\theta \\ \alpha \sin\theta \\ a \\ b \end{bmatrix} = \begin{bmatrix} \frac{h' \times \sin(T')}{\tan(P')} \\ \frac{h' \times \cos(T')}{\tan(P')} \end{bmatrix},$$

wherein h represents height of the first camera from ground, T represents pitch angel of the first camera, P represents horizontal rotational angle of the first camera, h' represents height of the second camera from ground, T' represents pitch angle of the second camera, P' represents horizontal rotational angle of the second camera, a, b, $\alpha$ and $\theta$ are determined by the following equation:

$$\begin{bmatrix} x_1 & -y_1 & 1 & 0 \\ y_1 & x_1 & 0 & 1 \\ x_2 & -y_2 & 1 & 0 \\ y_2 & x_2 & 0 & 1 \\ x_3 & -y_3 & 1 & 0 \\ y_3 & x_3 & 0 & 1 \\ \vdots & \vdots & \vdots & \vdots \end{bmatrix} \begin{bmatrix} \alpha \cos\theta \\ \alpha \sin\theta \\ a \\ b \end{bmatrix} = \begin{bmatrix} x_1' \\ y_1' \\ x_2' \\ y_2' \\ x_3' \\ y_3' \\ \vdots \end{bmatrix},$$

wherein $(x_1,y_1)$, $(x_2,y_2)$, and $(x_3,y_3)$ are three given coordinates in a three-dimensional rectangular coordinate system established by taking a projection of the first camera on the ground as an origin, $(x_1',y_1')$, $(x_2',y_2')$, and $(x_3',y_3')$ are three given coordinates in a three-dimensional rectangular coordinate system established by taking a projection of the second camera on the ground as an origin, the relationship between the coordinates and the shooting positioning parameters of a corresponding camera comprises:

$$x = \frac{h \times \sin(T)}{\tan(P)}, \; y = \frac{h \times \cos(T)}{\tan(P)}, \; x' = \frac{h' \times \sin(T')}{\tan(P')}, \; y' = \frac{h' \times \cos(T')}{\tan(P')}.$$

11. The non-transitory storage medium according to claim 6, wherein after taking a first photo of an illegally parked vehicle using the first camera, the application is executed to:

if resolution of a license plate in the first photo is lower than a first predetermined threshold, adjust focal distance of the first camera and taking, with the first shooting positioning parameter, a third photo in which resolution of a license plate is greater than that in the first photo.

12. The non-transitory storage medium according to claim 6, wherein after controlling the second camera to take a second photo with the second shooting positioning parameter, the application is executed to:

adjust focal distance of the second camera and taking, with the second shooting positioning parameter, a fourth photo in which resolution of a license plate is greater than that in the second photo, if resolution of a license plate in the second photo is lower than a second predetermined threshold.

13. The non-transitory storage medium according to claim 6,
wherein the application is executed to obtain a license plate number and cab features from the first photo or the second photo based on the image analysis technique;
wherein the evidences for illegal parking comprises: the first photo, the second photo, the license plate number and the cab features.

14. The non-transitory storage medium according to claim 6, wherein, the correspondence relationship between the shooting positioning parameters of the first camera and the second camera is as follows:

$$\begin{bmatrix} \frac{h \times \sin(T)}{\tan(P)} & -\frac{h \times \cos(T)}{\tan(P)} & 1 & 0 \\ \frac{h \times \cos(T)}{\tan(P)} & \frac{h \times \sin(T)}{\tan(P)} & 0 & 1 \end{bmatrix} \begin{bmatrix} \alpha \cos \theta \\ \alpha \sin \theta \\ a \\ b \end{bmatrix} = \begin{bmatrix} \frac{h' \times \sin(T')}{\tan(P')} \\ \frac{h' \times \cos(T')}{\tan(P')} \end{bmatrix},$$

wherein h represents height of the first camera from ground, T represents pitch angel of the first camera, P represents horizontal rotational angle of the first camera, h' represents height of the second camera from ground, T' represents pitch angle of the second camera, P' represents horizontal rotational angle of the second camera, a, b, $\alpha$ and $\theta$ are determined by the following equation:

$$\begin{bmatrix} x_1 & -y_1 & 1 & 0 \\ y_1 & x_1 & 0 & 1 \\ x_2 & -y_2 & 1 & 0 \\ y_2 & x_2 & 0 & 1 \\ x_3 & -y_3 & 1 & 0 \\ y_3 & x_3 & 0 & 1 \\ \vdots & \vdots & \vdots & \vdots \end{bmatrix} \begin{bmatrix} \alpha \cos \theta \\ \alpha \sin \theta \\ a \\ b \end{bmatrix} = \begin{bmatrix} x'_1 \\ y'_1 \\ x'_2 \\ y'_2 \\ x'_3 \\ y'_3 \\ \vdots \end{bmatrix},$$

wherein $(x_1,y_1)$, $(x_2,y_2)$, and $(x_3,y_3)$ are three given coordinates in a three-dimensional rectangular coordinate system established by taking a projection of the first camera on the ground as an origin, $(x_1',y_1')$, $(x_2',y_2')$, and $(x_3',y_3')$ are three given coordinates in a three-dimensional rectangular coordinate system established by taking a projection of the second camera on the ground as an origin, the relationship between coordinates and the shooting positioning parameters of a corresponding camera comprises:

$$x = \frac{h \times \sin(T)}{\tan(P)}, y = \frac{h \times \cos(T)}{\tan(P)}, x' = \frac{h' \times \sin(T')}{\tan(P')}, y' = \frac{h' \times \cos(T')}{\tan(P')}.$$

15. The non-transitory storage medium according to claim 11, wherein, the correspondence relationship between the shooting positioning parameters of the first camera and the second camera is as follows:

$$\begin{bmatrix} \frac{h \times \sin(T)}{\tan(P)} & -\frac{h \times \cos(T)}{\tan(P)} & 1 & 0 \\ \frac{h \times \cos(T)}{\tan(P)} & \frac{h \times \sin(T)}{\tan(P)} & 0 & 1 \end{bmatrix} \begin{bmatrix} \alpha \cos \theta \\ \alpha \sin \theta \\ a \\ b \end{bmatrix} = \begin{bmatrix} \frac{h' \times \sin(T')}{\tan(P')} \\ \frac{h' \times \cos(T')}{\tan(P')} \end{bmatrix},$$

wherein h represents height of the first camera from ground, T represents pitch angel of the first camera, P represents horizontal rotational angle of the first camera, h' represents height of the second camera from ground, T' represents pitch angle of the second camera, P' represents horizontal rotational angle of the second camera, a, b,$\alpha$ and $\theta$ are determined by the following equation:

$$\begin{bmatrix} x_1 & -y_1 & 1 & 0 \\ y_1 & x_1 & 0 & 1 \\ x_2 & -y_2 & 1 & 0 \\ y_2 & x_2 & 0 & 1 \\ x_3 & -y_3 & 1 & 0 \\ y_3 & x_3 & 0 & 1 \\ \vdots & \vdots & \vdots & \vdots \end{bmatrix} \begin{bmatrix} \alpha \cos \theta \\ \alpha \sin \theta \\ a \\ b \end{bmatrix} = \begin{bmatrix} x'_1 \\ y'_1 \\ x'_2 \\ y'_2 \\ x'_3 \\ y'_3 \\ \vdots \end{bmatrix},$$

wherein $(x_1,y_1)$, $(x_2,y_2)$, and $(x_3,y_3)$ are three given coordinates in a three-dimensional rectangular coordinate system established by taking a projection of the first camera on the ground as an origin, $(x_1',y_1')$, $(x_2',y_2')$, and $(x_3',y_3')$ are three given coordinates in a three-dimensional rectangular coordinate system established by taking a projection of the second camera on the ground as an origin, the relationship between coordinates and the shooting positioning parameters of a corresponding camera comprises:

$$x = \frac{h \times \sin(T)}{\tan(P)}, y = \frac{h \times \cos(T)}{\tan(P)}, x' = \frac{h' \times \sin(T')}{\tan(P')}, y' = \frac{h' \times \cos(T')}{\tan(P')}.$$

16. The non-transitory storage medium according to claim 12, wherein, the correspondence relationship between the shooting positioning parameters of the first camera and the second camera is as follows:

$$\begin{bmatrix} \frac{h \times \sin(T)}{\tan(P)} & -\frac{h \times \cos(T)}{\tan(P)} & 1 & 0 \\ \frac{h \times \cos(T)}{\tan(P)} & \frac{h \times \sin(T)}{\tan(P)} & 0 & 1 \end{bmatrix} \begin{bmatrix} \alpha \cos \theta \\ \alpha \sin \theta \\ a \\ b \end{bmatrix} = \begin{bmatrix} \frac{h' \times \sin(T')}{\tan(P')} \\ \frac{h' \times \cos(T')}{\tan(P')} \end{bmatrix},$$

wherein h represents height of the first camera from ground, T represents pitch angel of the first camera, P represents horizontal rotational angle of the first camera, h' represents height of the second camera from ground, T' represents pitch angle of the second camera, P' represents horizontal rotational angle of the second camera, a, b, $\alpha$ and $\theta$ are determined by the following equation:

$$\begin{bmatrix} x_1 & -y_1 & 1 & 0 \\ y_1 & x_1 & 0 & 1 \\ x_2 & -y_2 & 1 & 0 \\ y_2 & x_2 & 0 & 1 \\ x_3 & -y_3 & 1 & 0 \\ y_3 & x_3 & 0 & 1 \\ \vdots & \vdots & \vdots & \vdots \end{bmatrix} \begin{bmatrix} \alpha \cos \theta \\ \alpha \sin \theta \\ a \\ b \end{bmatrix} = \begin{bmatrix} x'_1 \\ y'_1 \\ x'_2 \\ y'_2 \\ x'_3 \\ y'_3 \\ \vdots \end{bmatrix},$$

wherein $(x_1,y_1)$, $(x_2,y_2)$, and $(x_3,y_3)$ are three given coordinates in a three-dimensional rectangular coordinate system established by taking a projection of the first camera on the ground as an origin, $(x_1',y_1')$, $(x_2',y_2')$, and $(x_3',y_3')$ are three given coordinates in a three-dimensional rectangular coordinate system established by taking a projection of the second camera on the ground as an origin, the relationship between coordinates and the shooting positioning parameters of a corresponding camera comprises:

$$x = \frac{h \times \sin(T)}{\tan(P)}, y = \frac{h \times \cos(T)}{\tan(P)}, x' = \frac{h' \times \sin(T')}{\tan(P')}, y' = \frac{h' \times \cos(T')}{\tan(P')}.$$

17. The non-transitory storage medium according to claim 13, wherein, the correspondence relationship between the shooting positioning parameters of the first camera and the second camera is as follows:

$$\begin{bmatrix} \frac{h \times \sin(T)}{\tan(P)} & -\frac{h \times \cos(T)}{\tan(P)} & 1 & 0 \\ \frac{h \times \cos(T)}{\tan(P)} & \frac{h \times \sin(T)}{\tan(P)} & 0 & 1 \end{bmatrix} \begin{bmatrix} \alpha \cos \theta \\ \alpha \sin \theta \\ a \\ b \end{bmatrix} = \begin{bmatrix} \frac{h' \times \sin(T')}{\tan(P')} \\ \frac{h' \times \cos(T')}{\tan(P')} \end{bmatrix},$$

wherein h represents height of the first camera from ground, T represents pitch angel of the first camera, P represents horizontal rotational angle of the first camera, h' represents height of the second camera from ground, T' represents pitch angle of the second camera, P' represents horizontal rotational angle of the second camera, a, b, α and θ are determined by the following equation:

$$\begin{bmatrix} x_1 & -y_1 & 1 & 0 \\ y_1 & x_1 & 0 & 1 \\ x_2 & -y_2 & 1 & 0 \\ y_2 & x_2 & 0 & 1 \\ x_3 & -y_3 & 1 & 0 \\ y_3 & x_3 & 0 & 1 \\ \vdots & \vdots & \vdots & \vdots \end{bmatrix} \begin{bmatrix} \alpha \cos \theta \\ \alpha \sin \theta \\ a \\ b \end{bmatrix} = \begin{bmatrix} x_1' \\ y_1' \\ x_2' \\ y_2' \\ x_3' \\ y_3' \\ \vdots \end{bmatrix},$$

wherein $(x_1,y_1)$, $(x_2,y_2)$, and $(x_3,y_3)$ are three given coordinates in a three-dimensional rectangular coordinate system established by taking a projection of the first camera on the ground as an origin, $(x_1',y_1')$, $(x_2',y_2')$ and $(x_3',y_3')$ are three given coordinates in a three-dimensional rectangular coordinate system established by taking a projection of the second camera on the ground as an origin, the relationship between coordinates and the shooting positioning parameters of a corresponding camera comprises:

$$x = \frac{h \times \sin(T)}{\tan(P)}, y = \frac{h \times \cos(T)}{\tan(P)}, x' = \frac{h' \times \sin(T')}{\tan(P')}, y' = \frac{h' \times \cos(T')}{\tan(P')}.$$

* * * * *

UNITED STATES PATENT AND TRADEMARK OFFICE
CERTIFICATE OF CORRECTION

PATENT NO. : 10,229,588 B2
APPLICATION NO. : 15/516795
DATED : March 12, 2019
INVENTOR(S) : Jun Che et al.

Page 1 of 1

It is certified that error appears in the above-identified patent and that said Letters Patent is hereby corrected as shown below:

In the Claims

Line 12 on Column 15, Claim 5, T" should be corrected as T'

Line 1 on Column 17, Claim 8, (1, y1) should be corrected as (x1, y1)

Signed and Sealed this
Twenty-eighth Day of May, 2019

Andrei Iancu
*Director of the United States Patent and Trademark Office*